(12) United States Patent
Voss et al.

(10) Patent No.: US 6,248,450 B1
(45) Date of Patent: Jun. 19, 2001

(54) HIGH ADHESION OF A VARIETY OF RUBBER COMPOUNDS TO FABRIC USING A SINGLE RESORCINOL-FORMALDEHYDE LATEX COMPOSITION

(75) Inventors: Gary D. Voss, Winston-Salem; Benny B. Smith, Kernersville, both of NC (US)

(73) Assignee: Highland Industries, Inc., Greensboro, NC (US)

( * ) Notice: Subject to any disclaimer, the term of this patent is extended or adjusted under 35 U.S.C. 154(b) by 0 days.

(21) Appl. No.: 09/504,737

(22) Filed: Feb. 16, 2000

(Under 37 CFR 1.47)

Related U.S. Application Data

(62) Division of application No. 08/773,570, filed on Dec. 27, 1996, now Pat. No. 6,054,527.

(51) Int. Cl.[7] ................................................. B32B 27/26
(52) U.S. Cl. ................................... 428/475.8; 156/307.5; 442/63; 428/483
(58) Field of Search .......................... 442/63; 156/307.5; 428/475.8, 483

(56) References Cited

U.S. PATENT DOCUMENTS

| | | | |
|---|---|---|---|
| 2,128,229 | 8/1938 | Charch et al. ........................... | 154/40 |
| 2,128,635 | 8/1938 | Charch et al. ........................... | 154/40 |
| 2,499,724 | 3/1950 | Compton ................................ | 154/136 |
| 2,691,614 | 10/1954 | Wilson .................................. | 154/139 |
| 2,746,989 | 5/1956 | Buckwalter et al. ................... | 154/139 |
| 2,774,703 | 12/1956 | Reynolds ................................ | 154/139 |
| 3,018,207 | 1/1962 | Danielson .............................. | 154/52 |
| 3,144,428 | 8/1964 | Kost ...................................... | 260/43 |
| 3,240,651 | 3/1966 | Atwell ................................... | 156/333 |
| 3,242,118 | 3/1966 | St, Clair ................................ | 260/29.3 |
| 3,437,610 | 4/1969 | Moult ..................................... | 260/3 |
| 3,449,200 | 6/1969 | Kalafus et al. ......................... | 161/92 |
| 3,549,481 | 12/1970 | Cesare et al. ........................... | 161/198 |
| 3,578,613 | 5/1971 | Tai ......................................... | 260/3 |
| 3,725,177 | 4/1973 | Vacellio ................................ | 156/333 |
| 3,775,150 | 11/1973 | McClary ................................ | 117/7 |
| 3,922,468 | 11/1975 | Burke, Jr. et al. ..................... | 428/414 |
| 4,012,350 | 3/1977 | Burke, Jr. et al. ..................... | 260/29.3 |
| 4,401,713 | 8/1983 | Takata ................................... | 428/290 |
| 4,462,855 | 7/1984 | Yankowsky et al. .............. | 156/307.3 |
| 4,463,110 | 7/1984 | Perlinski et al. ...................... | 523/409 |
| 4,818,601 | 4/1989 | Itoh et al. ............................. | 428/297 |
| 5,206,289 | 4/1993 | Sinsky et al. ......................... | 525/114 |
| 5,609,962 | 3/1997 | Ouhadi ................................. | 428/480 |

OTHER PUBLICATIONS

"My Experience with Grilbond IL–6. Improved Adhesion on Pes Cord Fabrics with Processing Cost Reduction"; Lucien Hennicot; Mar. 20, 1995.

*Primary Examiner*—Robert Dawson
*Assistant Examiner*—D. Aylward
(74) *Attorney, Agent, or Firm*—Rhodes & Mason, P.L.L.C.

(57) ABSTRACT

A single adhesive composition for use in bonding more than one class of rubber polymer to textiles, in particular nylon and polyester fabric. The composition comprises an aqueous mixture of: a) about 85 to about 90 weight % polychloroprene latex; b) about 2 to about 6 weight % of at least one prepolymer of resorcinol with formaldehyde; c) about 4 to about 8% by weight of at least one blocked diisocyanate compound; and d) sufficient water to adjust the solids content of the mixture to about 15 to about 40% by weight; wherein the percentage of solids add-on on fabric treated with the composition ranges between about 5 and about 20% based on the weight of the untreated fabric. The preferred blocked diisocyanate compound is caprolactam blocked methylene-bis-(4-phenylisocyanate). The end-products that are contemplated for the present invention include, but are not limited to, diaphragms, molded articles, V-belt covers, conveyor belts, bead wraps for tires, hose wrap, dodge couplings and the like.

19 Claims, No Drawings

HIGH ADHESION OF A VARIETY OF RUBBER COMPOUNDS TO FABRIC USING A SINGLE RESORCINOL-FORMALDEHYDE LATEX COMPOSITION

This application is a division of utility application Ser. No. 08/773570, filed Dec. 27, 1996, U.S. Pat. No. 6,054,527.

FIELD OF THE INVENTION

The present invention relates to an adhesive composition that is used for bonding a variety of rubber compounds to textiles. More specifically, the present invention relates to a single adhesive composition that bonds more than one class of elastomeric polymer to fabric to produce end-products such as diaphragms, molded articles, V-belt covers, conveyor belts, hose wrap and the like.

BACKGROUND OF THE INVENTION

For many products such as diaphragms, molded articles, bead wraps for tires, V-belt covers and the like, stringent requirements exist for the bond between the rubber and the substrate to which it is attached. It is only by using special adhesives that sufficient adhesion is obtained between rubber and synthetic fibers, since synthetic fibers have a low affinity for the rubber compound due to the lack of binding sites in the fibers.

Developed in 1935, the resorcinol-formaldehyde resins are among the oldest adhesives to achieve rubber to textile adhesion. They are used in an aqueous phase in conjunction with latex, hence they are commonly referred to as resorcinol-formaldehyde latex (RFL) compounds. Commonly used RFL compounds are limited in several respects. First, some RFLs are able to bond to only one type of fabric. For example, a latex based on butadiene-styrene-2-vinyl-pyridine ("vinylpyridine latex") was developed for bonding rubber to polyamide fibers. This adhesive composition, however, is insufficient for bonding polyester fibers to rubber. Second, typical RFLs are formulated to bond only one class of elastomeric or rubber polymer to fabric. Consequently, to achieve strong adhesion of a particular rubber to fabric using an RFL formulation, that particular rubber should be included in the RFL formulation. For example, to bind nitrile rubber to fabric, nitrile is typically used as a component in the RFL formulation.

Because of the inability of existing RFL formulations to bind more than one class of rubber polymer, it is necessary to prepare different RFL formulations during the fabric finishing process. The RFL formulations that are prepared will depend on the rubber compound that is to be ultimately bound to the fabric. Such production of specifically tailored adhesives is both time-consuming and costly. Changeovers with different adhesive formulations are inefficient and time-consuming. Moreover, preparation of multiple adhesive formulations poses an increased risk in the selection of the improper RFL formulation for treating the fabric.

While obtaining good adhesion between the desired rubber and treated fabric is of paramount importance, there is a real need for the development of a single adhesive composition which can be used to bond more than one class of elastomeric polymer to textiles.

SUMMARY OF THE INVENTION

The present invention is directed to a single adhesive composition for use in bonding or reinforcing a variety of rubber polymers to textiles, in particular woven fabric. The composition comprises an aqueous mixture of a) a polychloroprene latex; b) at least one prepolymer of resorcinol with formaldehyde; c) at least one blocked diisocyanate compound, and d) sufficient water to adjust the solids content of the aqueous mixture from about 15 to about 40% by weight. The novelty of the present invention is based on the ability of the adhesive composition to bond more than one class of rubber polymer to fabric.

The adhesive composition further includes additional formaldehyde which enhances the chemical reaction of the aqueous mixture. A non-ionic surfactant is also contained in the composition, and functions to lower the surface tension of the aqueous mixture. Sufficient alkaline such as caustic soda is included as a catalyst and also to adjust the pH of the final composition between about 9 and about 11. If desired, carbon black may be added to the aqueous mixture to provide color.

The adhesive composition of the present invention overcomes the disadvantages of current adhesive formulations by being compatible with a variety of natural and synthetic rubber polymers. Regardless of the rubber that is bound to the fabric, a single adhesive composition has been discovered which is capable of providing strong adhesion between a variety of rubbers and fabric substrates including, but not limited to nylon, polyester, and blends thereof.

For purposes of this invention, the elastomers or rubber polymers include, but are not limited to, polychloroprene, more commonly known as neoprene, nitrile, natural rubber, fluoroelastomer, hypalon, and EPDM (ethylene-propylene terpolymer). The end-products that are contemplated by the present invention include, but are not limited to, diaphragms, molded articles, V-belt covers, conveyor belts, hose wrap, bead wraps for tires, dodge couplings and the like.

In one embodiment of the present invention, the adhesive composition for bonding a variety of rubber compounds to fabric, comprises an aqueous mixture of: a) about 85 to about 90 weight % polychloroprene latex; b) about 2 to about 6 weight % of at least one prepolymer of resorcinol with formaldehyde; c) about 4 to about 8 weight % of at least one blocked diisocyanate compound; and d) sufficient water to adjust the solids content of the mixture to about 15 to about 40 weight %, wherein the percentage of solids add-on on fabric treated with the adhesive composition ranges between about 5 and about 20% based on the untreated fabric weight.

In yet one preferred embodiment, the blocked diisocyanate compound is caprolactam blocked methylene-bis-(4-phenylisocyanate).

In another embodiment, the non-ionic surfactant is present in an amount of approximately 0.5 weight %.

A process is disclosed for adhering rubber compounds to synthetic fabric, comprising the steps of:

a) impregnating or dipping fabric in an aqueous mixture comprising a polychloroprene latex, a resorcinol-formaldehyde reaction product, at least one blocked diisocyanate compound, and sufficient water to adjust the solids content of the mixture to about 15 to about 40% by weight, wherein the percentage of solids add-on on fabric treated with the mixture ranges between about 5 and about 20% based on the weight of the untreated fabric;

b) drying the treated fabric at temperatures ranging between about 220° and 270° F. for approximately 1 minute;

c) curing the dried fabric for about 2 minutes at approximately 375° F. to bond the mixture to the fabric;

d) applying at least one rubber polymer to the cured fabric; and thereafter e) vulcanizing the rubber to the fabric for a sufficient time and at sufficient pressure.

Additional features and advantages of the present invention are further described, and will be apparent from the detailed description from the presently preferred embodiments.

peratures ranging between approximately 220° and 275° F. for a sufficient period of time to dry the fabric. The fabric is then cured at temperatures between about 300° and about 400° F. for about 2 minutes. The fabric is then cooled. At this point, the fabric is now ready to be bonded to a pre-selected rubber polymer by vulcanization.

For purposes of the present invention, although other polychloroprene latexes may be used in the adhesive composition, the preferred polychloroprene latex is Neoprene 571, a commercially available neoprene latex from E.I. du Pont. The specifications for Neoprene 571 are shown below in Table I:

TABLE I

| Neoprene 571 | | | | | |
|---|---|---|---|---|---|
| Neoprene Latex Type | Primary Monomer | Co-Monomer | Emulsifier | Emulsifier Class | Chlorine Content % |
| 571 | Chloroprene | Sulfur | Principally sodium salts of resin acids | Anionic | 37.5 |

| pH at 25° C. | Standard Solids | Brookfield Viscosity at 25° C. | Spindle Number | Speed rpm | Features | Applications |
|---|---|---|---|---|---|---|
| 12.0 | 50 | 15 [15] | 1 | 6 | High strength cured films combined with low permanent set | Adhesives Coatings Dipped Goods |
| | | 15 [15] | 1 | 30 | | |

DETAILED DESCRIPTION OF THE PREFERRED EMBODIMENTS

In accordance with the present invention, a single adhesive formulation is disclosed that is capable of adhering a variety of rubber compounds to woven fabric, in particular nylon, polyester and blends thereof. The adhesive composition, comprises an aqueous mixture of: a) about 85 to about 90 weight % of polychloroprene latex; b) about 2 to about 6 weight % of at least one prepolymer of resorcinol with formaldehyde; c) about 4 to about 8 weight % of at least one blocked diisocyanate compound; and d) sufficient water to adjust the solids content of the mixture to about 15 to about 40 weight %, wherein the percentage of solids add-on on the treated fabric ranges between about 5 and about 20% based on the untreated or griege fabric weight.

While the present adhesive composition contains between about 15 to about 40 weight % solids, this percentage can vary depending on the "add on" required for a particular fabric substrate, in other words, the amount of solids needed to coat the fabric. Typically, approximately 12% add-on of mixed solids is applied to treated fabric based on the weight of the untreated fabric. Add-on is evaluated after the fabric has been dipped and dried. Insufficient add-on or too much add-on will cause poor adhesion of the rubber polymer to the fabric.

In the process of the present invention, pre-selected fabric is dipped into or impregnated with the adhesive composition with sufficient pressure to allow the composition to penetrate the fabric. Any excess is removed from the fabric. The treated fabric is then dried in a commercial oven at tem- As discussed in greater detail below, Formula 1524-12, a 24% resorcinol-formaldehyde neoprene, represents the adhesive composition that was used to carry out the present invention. To prepare Formula 1524-12, the following steps were performed:

| | FORMULA 1524-12 | | | |
|---|---|---|---|---|
| | | Wet Wt. | Dry Wt. | % Dry Wt. |
| 1. | Weigh to black mix tank Neoprene 571 | 3150 | 1575.0 | 87.04 |
| 2. | Weigh to black weigh tank. Mix for 5 min. Drain to black mix tank. | | | |
| | Water | 520 | | |
| | Ajack black | 70 | 25.9 | 1.43 |
| | Surfactant | 40 | 10.0 | 0.55 |
| 3. | Weigh to black weigh tank. Drain to black mix tank. Age 1 hour before draining. | | | |
| | Water | 4000 | | |
| | SRF-1524 (pre-reacted resorcinol/formaldehyde-Hooker Chemicals) | 100 | 75.0 | 4.15 |
| | Formaldehyde | 50 | 18.5 | 1.02 |
| | 50% Caustic | 10 | 5.0 | 0.28 |

-continued

FORMULA 1524-12

|  | Wet Wt. | Dry Wt. | % Dry Wt. |
|---|---|---|---|
| 4. Weigh to black weigh tank and drain to black mix tank. |  |  |  |
| Grilbond IL-6 | 200 | 100 | 5.53 |
| Water | 200 |  |  |
| 5. Stir for 30 minutes. Sample to lab. |  |  |  |
| TOTAL | 8340 | 1869.4 | 100.0 |

TABLE II

Q.C. ANALYSIS OF FORMULA 1524-12

| Test | Method | Specification |
|---|---|---|
| % Solids | HI-115 | 24.0% ± 1.5% |
| pH | HI-102 | 10.0 ± 1.0 |
| Viscosity | HI-103 | Report |
| Adhesion | HI 0.5 Neoprene N1402001/14019011 @ 290° F. 30 min. | 20 lbs minimum |

It should be noted that Grilbond IL-6 represents the adhesion promoter or bonding agent that is used in the adhesive composition of the present invention. A blocked diisocyanate which functions by blocking moisture, Grilbond IL-6 is commercially available from EMS American Grilon Inc., Sumter, S.C. Other blocked diisocyanates such as Desmodur TT may also be used.

To evaluate the adhesion of rubber polymers and rubber-like materials to fabrics, the following industry wide test method was used:

Test Method Specification
Procedure
1. Cut two 4×8" samples from the treated fabric swatch to be tested. The 8" cut is to be made in the warp direction.
2. Ply these samples by placing one piece of rubber (type and thickness to be specified) 4×4" on each side and between the two fabric samples. Place the sample of fabric so that each face of the original sample contacts the center separating rubber stock. Use tag cloth on each side of ply to prevent sticking to the press platten.
3. Cure the ply in a press according to the desired specification for temperature, pressure and time.*
*If there are no specifications, cure at 290° F. for 30 min. at 125 psi.
4. Remove the cured ply from the press. Allow to cool and condition to room temperature (at least 30 min.) Cut the sample to a width of exactly one inch and a length of at least 6 inches. Make the cut so that it follows a warp yarn.
5. Clamp the cut ply in a tensile tester set at a pull rates of 2 inches per minute. Clamp the ply in the jaws of the tester so that the fabric will be peeled from the separating rubber stock. Start the tester and allow it to peel for a distance of ¾" before taking a reading. With knife, cut the separating rubber stock so that it peels from one side of fabric only. Record average reading for a distance of one inch.
6. Cut the separating rubber stock so that the rubber now peels from the other side of fabric. Record this average reading for a distance of one inch.

The average reading for each sample of fabric was recorded. The average was based on two readings. The test specimens were examined and given a quantitative value.

The following results shown in Table III below were obtained following adhesion tests on a variety of rubber polymers on nylon and polyester fabrics using Formula 1524-12. The adhesion results are reported as pounds per lineal inch (pli).

TABLE III

FORMULA 1524-12

|  | Neoprene | Nitrile | Hypalon | EPDM | Fluoro-elastomer |
|---|---|---|---|---|---|
| Nylon | 52 | 60 | 25 | 30 | 30 |
| Polyester | 35 | 30 | 35 | 28 | 32 |

As shown in Table III, the single adhesive formula (1524-12) provided good adhesion for a variety of rubber polymers to both nylon and polyester fabric. All adhesion values are well-above the 20 lbs minimum threshold that is commonly required by the rubber industry.

To demonstrate the advantages that the present adhesive composition has over current RFL compositions, a number of comparative adhesion tests were conducted using typical RFL formulations and combinations thereof. These results are reported below:

| COMPARATIVE RFL FORMULATION #1 | |
|---|---|
| Neoprene 571 | 1860 |
| LVP 4668B contains vinylpyridine | 620 |
| Black KFO | 400 |
| Water | 800 |
| Water | 2204 |
| Formaldehyde-resin | 160 |
| Formaldehyde | 60 |
| Water | 2041 |
| Desmodur TT | 170 |
| Surfactant | 25 |
|  | 8340 |

Nylon fabric was impregnated or dipped with formulation #1, dried for about 3 minutes at 265° F., and then cured for about 2 minutes at 400° F. Adhesion of various rubbers was tested and reported below in pounds per inch. With the use of a neoprene and vinylpyridine latex in the adhesive formulation, good adhesion was obtained only for nitrile, but not for neoprene or EPDM.
Neoprene—7
EPDM—13
Nitrile—39

| COMPARATIVE RFL FORMULATION #2 | |
|---|---|
| Neoprene 571 | 1200 |
| LVP 4668B contains vinylpyridine | 1280 |
| Black KFO | 400 |
| Water | 800 |
| Water | 2204 |
| Formaldehyde-resin | 160 |
| Formaldehyde | 60 |
| Water | 1961 |
| Desmodur TT | 250 |
| Surfactant | 25 |
|  | 8340 |

Nylon fabric was impregnated or dipped with formulation #2, dried for about 3 minutes at 265° F., and then cured for about 2 minutes at 400° F. Adhesion of various rubbers was tested and reported below in pounds per inch. With the use of a neoprene and vinylpyridine latex in approximately equal ratios, again as with formulation #1, good adhesion was obtained for nitrite, but not for neoprene or EPDM.

Neoprene—7

EPDM—13

Nitrile—38

| COMPARATIVE RFL FORMULATION #3 | |
|---|---|
| LVP 4668B | 3000 |
| Black KFO | 400 |
| Water | 800 |
| Water | 2204 |
| Formaldehyde-resin | 221 |
| Formaldehyde | 84 |
| Water | 1436 |
| Desmodur TT | 170 |
| Surfactant | 25 |
| | 8340 |

Nylon fabric was impregnated or dipped with formulation #3, dried for about 3 minutes at 265° F., and then cured for about 2 minutes at 400° F. Adhesion of various rubbers was tested and reported below in pounds per inch. With the use of a vinylpyridine latex, good adhesion was obtained only for nitrite, but not for neoprene or EPDM.

Neoprene—5

EPDM—12

Nitrile—44

| COMPARATIVE RFL FORMULATION #4 | |
|---|---|
| LVP 4668B | 1500 |
| Hycar 1572 - a nitrile latex | 1500 |
| Black KFO | 400 |
| Water | 800 |
| Water | 2204 |
| Formaldehyde-resin | 221 |
| Formaldehyde | 84 |
| Water | 1436 |
| Desmodur TT | 170 |
| Surfactant | 25 |
| | 8340 |

Nylon fabric was impregnated or dipped with formulation #4, dried for about 3 minutes at 265° F., and then cured for about 2 minutes at 400° F. Adhesion of various rubbers was tested and reported below in pounds per inch. With the use of a vinylpyridine and nitrile latex in approximately equal ratios in the adhesive formulation, good adhesion was obtained only for nitrile, but not for neoprene or EPDM.

Neoprene—6

EPDM—8

Nitrile—44

| COMPARATIVE RFL FORMULATION #5 | |
|---|---|
| LVP 4668B | 750 |
| Hycar 1572 | 2250 |

| COMPARATIVE RFL FORMULATION #5 | |
|---|---|
| Black KFO | 400 |
| Water | 800 |
| Water | 2204 |
| Formaldehyde-resin | 221 |
| Formaldehyde | 84 |
| Water | 1436 |
| Desmodur TT | 170 |
| Surfactant | 25 |
| | 8340 |

Nylon fabric was impregnated or dipped with formulation #5, dried for about 3 minutes at 265° F., and then cured for about 2 minutes at 400° F. Adhesion of various rubbers was tested and reported below in pounds per inch. With the use of a vinylpyridine and a larger amount of nitrile latex in contrast to formulation #4, good adhesion was obtained only for nitrile, but not for neoprene or EPDM.

Neoprene—9

EPDM—8

Nitrile—38

| COMPARATIVE RFL FORMULATION #6 | |
|---|---|
| Hycar 1572 | 1500 |
| Neoprene 571 | 1500 |
| Black KFO | 400 |
| Water | 800 |
| Water | 2204 |
| Formaldehyde-resin | 221 |
| Formaldehyde | 84 |
| Water | 1436 |
| Desmodur TT | 170 |
| Surfactant | 25 |
| | 8340 |

Nylon fabric was impregnated or dipped with formulation #6, dried for about 3 minutes at 265° F., and then cured for about 2 minutes at 400° F. Adhesion of various rubbers was tested and reported below in pounds per inch. With the use of a nitrile and neoprene latex, good adhesion was obtained only for nitrile, but not for neoprene or EPDM.

Neoprene—17

EPDM—9

Nitrile—40

| COMPARATIVE RFL FORMULATION #7 | |
|---|---|
| Hycar 1572 | 3000 |
| Black KFO | 400 |
| Water | 800 |
| Water | 2200 |
| SRF 1524 | 150 |
| Formaldehyde | 84 |
| Ammonia | 30 |
| Water | 1700 |
| | 8364 |

Nylon fabric was impregnated or dipped with formulation #7 with an adjusted pH of 9.5, dried for about 3 minutes at 265° F., and then cured for about 2 minutes at 400° F. Adhesion of various rubbers was tested and reported below in pounds per inch. With the use of a nitrile latex only, good adhesion was obtained for nitrile and neoprene, but not for EPDM and styrene butadiene rubber.

Nitrile—47/35

EPDM—3

Neoprene—29

Styrene butadiene rubber—14

| COMPARATIVE RFL FORMULATION #8 | |
|---|---|
| Formula 2002 - a styrene butadiene latex | 2670 |
| Formula 4668 - contains vinylpyridine | 3330 |
| Water | 663 |
| Surfactant | 400 |
| Black KFO | 300 |
| Water | 1000 |
| SRf 1524 | 203 |
| Formaldehyde | 124 |
| Caustic | 10 |

The formulation contained 35% solids and the latex to resin ratio was 13.7 parts to 1 part. Nylon fabric was impregnated or dipped with formulation #8, dried for about 3 minutes at 265° F., and then cured for about 4 minutes at 350° F. Adhesion of various rubbers was tested and reported below in pounds per inch. With the use of a styrene butadiene and vinylpyridine latex, good adhesion was obtained for the styrene butadiene rubber and EPDM, but not for neoprene or nitrile.

Styrene butadiene rubber—85

Neoprene—3

EPDM—30

Nitrile—3

| COMPARATIVE RFL FORMULATION #9 | |
|---|---|
| Formula 4668 contains vinylpyridine 1509S-5 surfactant | 5200 |
|  | 40 |
| Water | 40 |
| Water | 2280 |
| Caustic | 10 |
| SRF 1524 | 165 |
| Formaldehyde | 105 |
| Water | 250 |
| Grilbond-IL6 | 250 |

The formulation contained 35% solids and the latex to resin ratio was 13.7 parts to 1 part. Nylon fabric was impregnated or dipped with formulation #9, dried for about 3 minutes at 265° F., and then cured for about 4 minutes at 350° F. Adhesion of various rubbers was tested and reported below in pounds per inch. With the use of a vinylpyridine latex, good adhesion was obtained for styrene butadiene rubber and EPDM, but not for neoprene or nitrile.

Styrene butadiene rubber—90

Neoprene—6

EPDM—23

Nitrile—8

| COMPARATIVE RFL FORMULATION #10 | |
|---|---|
| Neoprene Latex 571 | 3000 |
| Formula 4668 contains vinylpyridine | 1540 |
| Water | 3289 |
| SRF 1524 | 346 |
| Formaldehyde | 165 |
| No adhesion promoter | |

The formulation contained 35% solids and the latex to resin ratio was 13.7 parts to 1 part. Nylon fabric was impregnated or dipped with formulation #10, dried or about 3 minutes at 265° F., and then cured for about 4 minutes at 350° F. Adhesion of various rubbers was tested and reported below in pounds per inch. With the use of a neoprene and vinylpyridine latex, good adhesion was obtained for the fluoroelastomer and EPDM, but not for neoprene or nitrile.

Neoprene—12

EPDM—34

Nitrile—12

Fluoroelastomer—35

As demonstrated by comparative RFL formulations #1 through #10, no single formulation provided good adhesion for all of the rubber polymers tested. Instead, adhesion of the rubbers to the fabric varied depending on which rubber polymer(s) was contained in the adhesive formulation. By contrast, the adhesive formulation of the present invention provided high adhesion for a number of rubber polymers to both nylon and polyester. It is expected that similar results may be achieved using blends of the nylon and polyester.

It should be understood that various changes and modifications to the presently preferred embodiments described herein will be apparent to those skilled in the art. Such changes and modifications can be made without departing from the scope of the present invention without diminishing its attendant advantages. It is therefore intended that such changes and modifications be covered by the appended claims.

We claim:

1. A synthetic fabric having high adhesion for a variety of natural and synthetic rubber polymers, comprising a fabric treated with an aqueous mixture comprising polychloroprene latex, at least one prepolymer of resorcinol with formaldehyde, at least one blocked diisocyanate compound, and sufficient water to adjust the solids content of the mixture to about 15 to about 40% by weight, wherein the percentage of solids add-on on the treated fabric ranges between about 5 and about 20% based on the weight of the untreated fabric, said treated fabric thereafter being dried and cured for a sufficient time and at a sufficient temperature to bond the mixture to the fabric.

2. The synthetic fabric according to claim 1, wherein the polychloroprene latex is in an amount of between 85 and about 90% by weight in the composition.

3. The synthetic fabric according to claim 1, wherein prepolymer of resorcinol with formaldehyde is present in an amount between about 2 and about 6 weight %.

4. The synthetic fabric according to claim 1, wherein the blocked diisocyanate compound is present in an amount between about 4 and about 8 weight %.

5. The synthetic fabric according to claim 1, wherein the blocked diisocyanate compound is caprolactam blocked methylene-bis-(4-phenylisocyanate).

6. The synthetic fabric according to claim 1, wherein the treated fabric is woven fabric.

7. The synthetic fabric according to claim 6, wherein the treated woven fabric includes nylon, polyester and blends thereof.

8. A process of adhering rubber polymers to synthetic fabrics, comprising the steps of:
   a) treating fabric with an aqueous mixture comprising a polychloroprene latex, a resorcinol-formaldehyde reaction product, at least one blocked diisocyanate compound, and sufficient water to adjust the solids content of the mixture to about 15 to about 40% by weight, wherein the percentage of solids add-on on fabric treated with the mixture ranges between about 5 and about 20% based on the weight of the untreated fabric;
   b) drying the treated fabric; and
   c) curing the dried fabric for a sufficient time and temperature to bond the mixture to the fabric;
   d) applying at least one rubber polymer to the cured fabric; and thereafter
   e) vulcanizing the rubber to the fabric.

9. The process according to claim 8, wherein the fabric is woven fabric.

10. The process according to claim 9, wherein the woven fabric includes nylon, polyester and blends thereof.

11. The process according to claim 8, wherein the fabric is dried at about 265° F. for approximately 1 minute.

12. The process according to claim 8, wherein the fabric is cured for approximately 2 minutes at 375° F. to bond the mixture to the fabric.

13. The process according to claim 8, wherein the polychloroprene latex is present in an amount between about 85 and about 90% by weight in the mixture.

14. The process according to claim 8, wherein the blocked diisocyanate compound is present in an amount between about 4 and about 8 weight %.

15. The process according to claim 8, wherein the blocked diisocyanate compound is caprolactam blocked methylene-bis-(4-phenylisocyanate).

16. The process according to claim 8, wherein the rubber polymer is selected from the group consisting of neoprene, nitrile, natural rubber, hypalon ethylene-propylene terpolymer and fluoroelastomer.

17. The process according to claim 8, wherein the aqueous mixture further includes formaldehyde.

18. The process according to claim 8, where the aqueous mixture further includes a non-ionic surfactant in an amount of about 0.4 to about 0.6% weight %.

19. A product produced by the process of claim 8.

* * * * *